Figure 1:
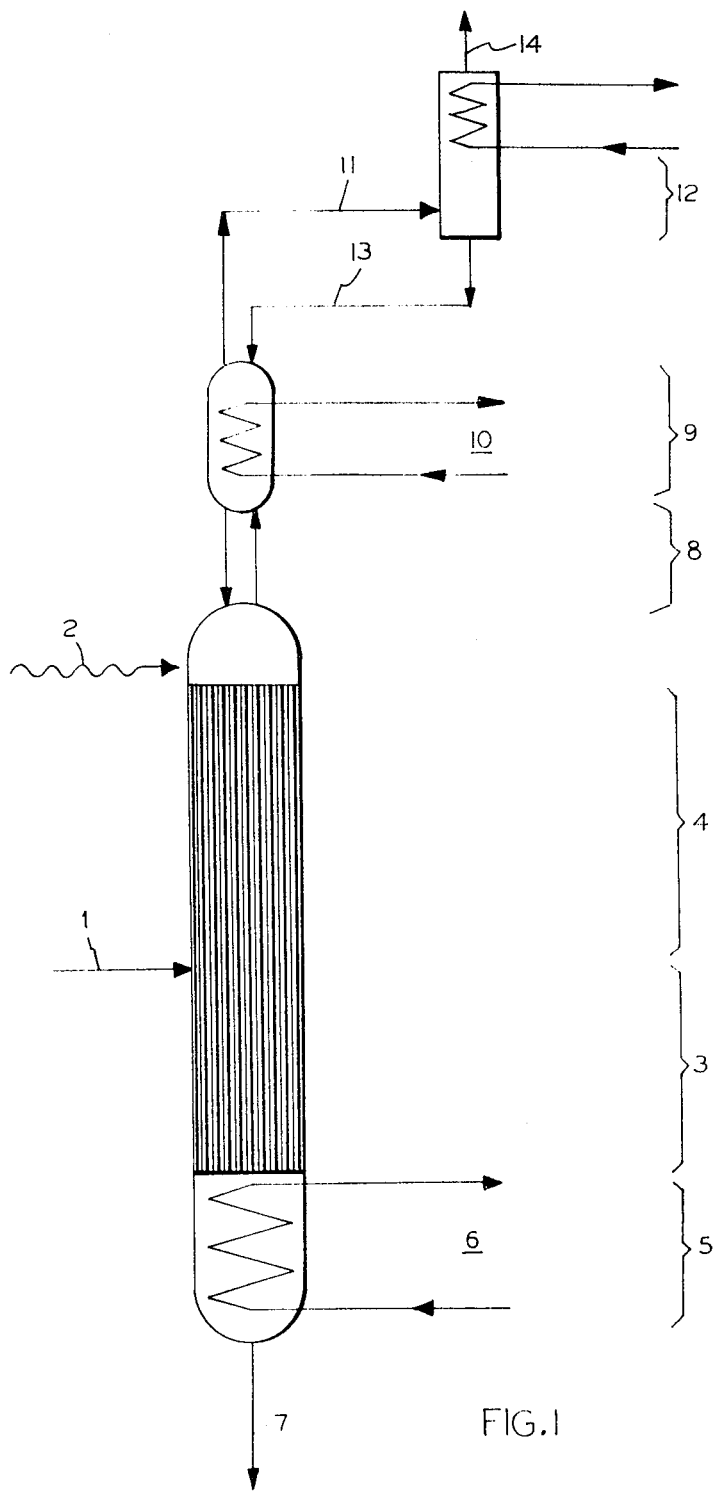

United States Patent [11] 3,607,671

| [72] | Inventors | Jean Riethmann;<br>Andreas W. Moerikofer, both of<br>Basel-Land, Switzerland |
|---|---|---|
| [21] | Appl. No. | 49,546 |
| [22] | Filed | July 2, 1970 |
| [45] | Patented | Sept. 21, 1971 |
| [73] | Assignee | Ciba-Geigy Corporation<br>Ardsley, N.Y.<br>Continuation-in-part of application Ser. No.<br>683,571, Nov. 16, 1967, now abandoned. |

[54] CONDENSING LIQUID CYANURIC CHLORIDE FROM CASES INCLUDING WASHING THE GASES WITH LIQUID PHOSPHOROUS OXYCHLORIDE
8 Claims, 2 Drawing Figs.

[52] U.S. Cl. ............................................. 203/50,
203/82, 203/42, 23/312, 23/76, 23/75, 23/298,
260/248
[51] Int. Cl. ........................................... C07d 55/42,
B01d 3/34, B01d 11/04
[50] Field of Search ............................................. 23/312,
294, 293, 76, 175, 151; 260/248; 55/37, 84, 85,
89; 203/50, 82, 42

[56] References Cited
UNITED STATES PATENTS

| 2,416,656 | 2/1947 | Thurston | 260/248 |
| 2,417,659 | 3/1947 | Oldham | 260/248 |
| 2,753,346 | 7/1956 | Huemer | 260/248 |
| 3,070,601 | 12/1962 | Johnson | 260/248 |
| 3,179,662 | 4/1965 | Finsstag | 23/294 X |
| 3,312,697 | 4/1967 | Riethmann | 260/248 |
| 3,338,898 | 8/1967 | Foulletier | 260/248 |
| 3,409,619 | 11/1968 | Kosel | 260/248 |

FOREIGN PATENTS

| 860,406 | 2/1961 | Great Britain | 23/294 |
| 1,007,307 | 10/1965 | Great Britain | 23/294 |

OTHER REFERENCES

Wilke, Sublimation: Its Applications, Chemical Industries, July, 1948, pp. 34–38.

*Primary Examiner*—Norman Yudkoff
*Assistant Examiner*—S. J. Emery
*Attorneys*—Karl F. Jorda and Martin J. Spellman

ABSTRACT: A process for the continuous recovery of substantially pure liquid cyanuric chloride from a gaseous mixture containing the same in mixture with other gases, especially with chlorine, which process involves, after separation from the mixture of a first portion of liquid cyanuric chloride by condensation, recovery of a second portion by dissolving the residual mixture containing the latter in phosphorous oxychloride and fractionation of the resulting solution.

CONDENSING LIQUID CYANURIC CHLORIDE FROM GASES INCLUDING WASHING THE GASES WITH LIQUID PHOSPHOROUS OXYCHLORIDE

This application is a continuation-in-part of our pending patent application Ser. No. 683,571, filed Nov. 16, 1967, now abandoned.

DESCRIPTION OF THE INVENTION

The present invention relates to the continuous production of liquid cyanuric chloride and, more particularly, to the condensation of pure cyanuric chloride from a hot gaseous mixture containing the same in combination with e.g. hydrogen chloride, cyanogen chloride, inert gases such as carbon dioxide and nitrogen, and chlorine.

Cyanuric chloride is a commercially important chemical product useful e.g. in the manufacture of optical brighteners, resins, dyes, pharmaceuticals and agricultural chemicals. It can be manufactured according to a number of different processes. For large volume manufacture the continuous process involving the reaction of hydrogen cyanide and gaseous chlorine with subsequent catalytic trimerization of the resulting cyanogen chloride in the vapor phase to cyanuric chloride has become widely accepted. In this process, cyanuric chloride is produced in gaseous form in admixture with gases which are substantially uncondensable at the necessary working temperatures and may consist of hydrogen chloride, cyanogen chloride, dicyanogen, carbon dioxide, nitrogen and chlorine (see French Pat. No. 1,311,400) or cyanogen chloride, other uncondensable gases and chlorine—the latter being added, e.g. in excess, to prolong the life of the activated trimerization carbon catalyst (see U.S. Pat. No. 3,312,697). Various efforts have been made up to now to recover cyanuric chloride from the gaseous mixture. Desublimation has been proposed by passing the gaseous cyanuric chloride into a rotating drum having particulate tumbling grinding media at a pressure and temperature at which desublimation occurs (see U.S. Pat. No. 3,256,070). Cyanuric chloride is thus obtained in a solid, finely divided form. Apart from the necessary bulky equipment prone to frequent shutdowns because of clogging and corrosion, the handling of such solid, dusty and lachrymatory cyanuric chloride should be avoided whenever possible for reasons of health, especially as there are many instances where cyanuric chloride is not needed in solid form. Thus, it can e.g. be advantageously further processed in liquid form in the production of certain herbicides according to U.S. Pat. No. 2,891,855, which are obtained by reacting cyanuric chloride with certain amines.

Desublimation in a conventional desublimer calls for large surface areas cooled e.g. by air circulation, which are costly compared with a conventional water cooled heat exchanger. In order to maintain adequate heat transfer, the walls must be kept free from deposited cyanuric chloride. This requires mechanical devices such as scrapers (see e.g. German Pat. publication No. 1,230,806) and/or special materials for the construction of the desublimer walls.

Furthermore, desublimation systems were proposed, where the cyanuric chloride gas stream is diluted with large quantities of inert gases (e.g. air) to provide the reduction of the partial pressure of cyanuric chloride necessary for a true desublimation at temperatures below the melting point of cyanuric chloride (145° C.). However, they are very voluminous and cumbersome because of the necessary recycling and cooling of the inert gases (see e.g. U.S. Pat. No. 3,179,662).

In short, up to now desublimation of gaseous cyanuric chloride has not been found to be a reasonable economical solution on an industrial scale, as the technical equipment available for the continuous large volume production of solid cyanuric chloride is not free from corrosion and maintenance shutdowns.

It has also been proposed to recover solid cyanuric chloride from a vapor stream of 400° C. comprising 90–95 percent of cyanuric chloride (the balance being cyanogen chloride) by contacting said stream with an inert organic liquid of the hydrocarbon class such as toluene or xylene (see U.S. Pat. No. 2,742,977). In this recovery, the liquid hydrocarbon is converted to vapor and the cyanuric chloride is converted to liquid. Cooling of the liquid cyanuric chloride yields solid cyanuric chloride and cooling of the hydrocarbon vapors yields liquid hydrocarbon which can be recycled. Because of the sensitivity of the proposed hydrocarbons to chlorine, this process is manifestly unsuitable for recovery of cyanuric chloride from gaseous mixtures containing chlorine such as are obtained according to French Pat. No. 1,311,400 and U.S. Pat. No. 3,312,697.

Finally, it has been proposed to recover cyanuric chloride from a gaseous mixture by condensing and dissolving the cyanuric chloride in an organic solvent such as benzene, carbon tetrachloride, chloroform, dioxan, acetone or acetone or acetonitrile, cooling the resultant solution to a temperature below the crystallization temperature of cyanuric chloride to effect crystallization of the dissolved cyanuric chloride and separating by filtration the cyanuric chloride from the solvent (see U.S. Pat. No. 3,338,898). Even if carbon tetrachloride—the only solvent, among those mentioned above as suitable for dissolving cyanuric chloride, which resists the chemical attack by the chlorine present in the gas mixture—is used, this process has several drawbacks. Owing to the relatively poor solubility of cyanuric chloride in carbon tetrachloride, the amount of carbon tetrachloride necessary for a given amount of cyanuric chloride is quite considerable, thus necessitating relatively large equipment for the circulation and recovery of the solvent and making substantial losses of the latter unavoidable. Furthermore, the separation of the cyanuric chloride by filtration and the removal of the residual solvent adhering to the crystals are operations which, due to the corrosive and hazardous nature of the substances handled, call for relatively complicated and costly equipment.

It has now been found that pure, liquid cyanuric chloride can be recovered continuously in substantially quantitative amounts from a gaseous mixture containing high contents of cyanuric chloride (80–95 weight percent), low contents of cyanogen chloride (2–5 weight percent) and substantial contents of chlorine (5–20 weight percent), such as is obtained according to the process of U.S. Pat. No. 3,312,697, or from a gaseous mixture containing lower contents of cyanuric chloride (40–55 weight percent), low contents of cyanogen chloride (2–5 weight percent), but substantial amounts of chlorine (10–30 weight percent) and hydrogen chloride (20–30 weight percent) such as is obtained according to the process of French Pat. No. 1,311,400. The recovery is carried out in a simple fractionation column by adding a suitable and cheap inorganic solvent, namely phosphorous oxychloride ($POCl_3$, also called phosphoryl chloride) at the top of the column, and withdrawing the liquid cyanuric chloride at the bottom of the column. Such fractionation columns are readily available in manufacturing plants, need a minimum of delicate control, and can be adapted without any difficulties to any desired scaleup. They are free from any moving parts and are thus not prone to any of the problems connected with corrosion and maintenance heretofore encountered in the recovery of cyanuric chloride. Furthermore liquid cyanuric chloride avoids any of the handling problems mentioned above and can readily be further processed.

The accompanying drawing is a diagrammatic flowsheet illustrating, in general, a continuous process according to the present invention.

The process of this invention is advantageously carried out as shown in FIG. 1 by continuously feeding the gaseous mixture comprising cyanuric chloride, cyanogen chloride and chlorine, or the gaseous mixture comprising cyanuric chloride, cyanogen chloride, hydrogen chloride and chlorine at 140°–350° C., preferably at 200°–260° C. into the fractionation column 2 which consists of a short stripping section 3 containing a packing of Raschig fillings and of a considerably longer rectifying section 4 with the same packing material. Above said fractionation column 2 there is a refluxing hold-up of said phosphorous oxychloride. The dimensions of the two sections 3 and 4 should be adjusted to obtain the necessary number of theoretical plates to produce a practically phosphorous oxychloride-free cyanuric chloride (e.g. with less than 50 p.p.m. $POCl_3$). The fractionation column 2 is, preferably, made from glass; other corrosion-resistant materials, especially nickel could also be employed.

At the bottom of section 3 there is provided an evaporator or reboiler 5 with heating coils 6 and a built-in syphon 7. The major part of the cyanuric chloride condenses in the column 2 at a temperature of 198°–199° C., and flows downward into the evaporator 5. From this evaporator 5, pure liquid cyanuric chloride containing only traces of phosphorous oxychloride is continuously withdrawn through the built-in syphon 7. Simultaneously a certain part of the pool of cyanuric chloride in the evaporator 5 is vaporized, and fed back into the column 2 at a temperature of 197°–199° C. The amount vaporized is chosen according to the concentration of cyanuric chloride in the feed gases and the total amount of the gases fed into the column 2. With this measure an appreciable degree of control is obtained over the conditions existing in the column 2. The cyanuric chloride vapors move upwards and are mixed with the uncondensed cyanuric chloride of the column feed and the residual gases (chlorine, cyanogen chloride and possibly hydrogen chloride). This gaseous mixture rises towards the top of the column 2 where it contacts in the section 4 at temperatures between 140°–145° C. the phosphorous oxychloride. The contacting step, then, gradually changes the cyanuric chloride vapor to cyanuric chloride liquid, while at the same time changing substantially all the phosphorous oxychloride from a liquid to a vapor. The temperature at the top of the column in section 4 is held at 90°–190° C., preferably 140°–160° C. when working under optimum conditions. These conditions can be maintained by proper regulation of the evaporator heat input and the holdup of the column with respect to phosphorous oxychloride. The condensed cyanuric chloride, which in the section 4 of the column is present at temperatures below its point of crystallization (said point determined by the local concentration existing in the solution containing phosphorous oxychloride at that moment), is kept in solution by the phosphorous oxychloride and returns quantitatively to the evaporator 5. In addition to the extraction of the residual gases, the phosphorous oxychloride serves as a heat transfer agent for the removal of the heat content of the feed gases and the latent heat of condensation of the cyanuric chloride. The phosphorous oxychloride vapor formed in the contacting step in section 4 together with the remaining cyanuric chloride vapor and the residual gases passes then out of the top of the column 2 by a conduit 8 into an ordinary condenser 9, operated with a cooling medium 10 where condensation takes place at temperatures corresponding to the composition and the partial vapor pressure of the phosphorous oxychloride/cyanuric chloride mixture in the residual gases. The condensed mixture of phosphorous oxychloride and cyanuric chloride is returned to the top of the column 2. In the same condenser 9, the remaining gases (chlorine, cyanogen chloride and possibly hydrogen chloride) are then cooled down to 15°–30° C. In this way it is possible to remove the heat contained in the incoming gas stream in a conventional heat exchanger 9. The gases leaving the condenser through conduit 11 are free from cyanuric chloride and contain only a small amount of phosphorous oxychloride which can be recovered as a liquid at the bottom of a small rectifying column 12 and recycled through conduit 13 into the main column 2, whereas chlorine and cyanogen chloride are withdrawn from the top column 12 through conduit 14. These gases can be fed back to the trimerization unit for reuse in the cyanuric chloride manufacture according to U.S. Pat. No. 3,312,697.

Figure 2:
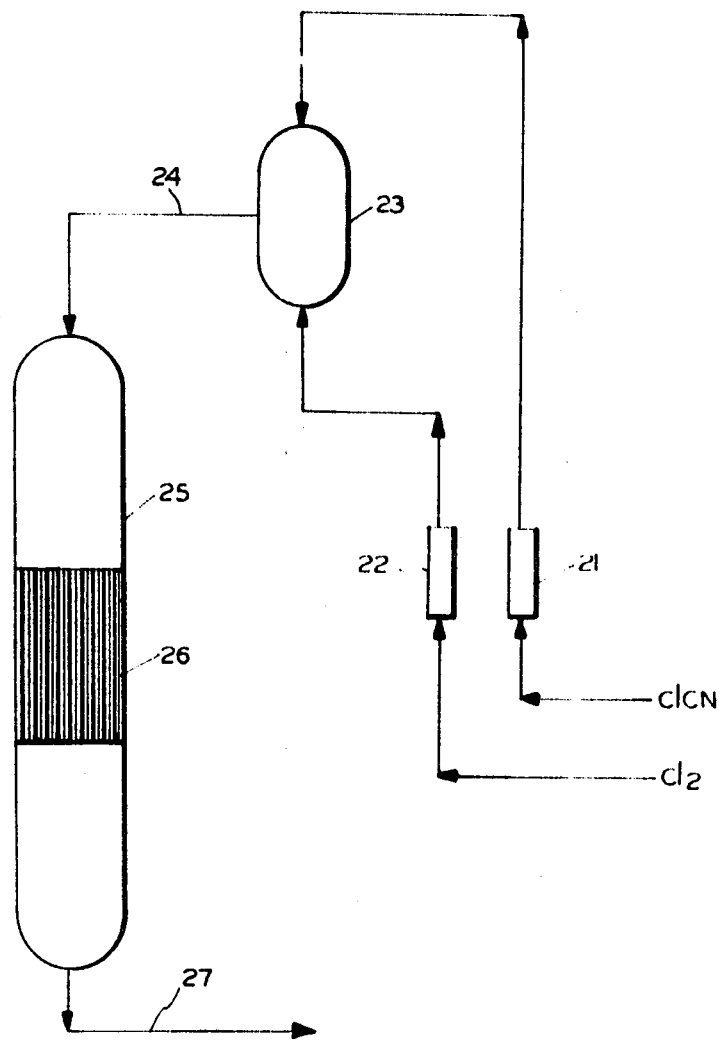

This latter measure, which is not part of the present invention, is illustrated schematically in FIG. 2:

The cyanogen chloride flow rate and the chlorine flow rate were adjusted by means of flow rate meters (rotameters) 21 and 22 to 26.7 parts by weight and 5.6 parts by weight/hour, respectively. The gases were mixed in vessel 23 and transported through conduit 24 to trimerizer 25 containing the activated carbon catalyst 26. The trimerizer 25 was heated to 330° C., whereby the reaction temperature in the reaction zone was 410° C. The gaseous reaction mixture was then transported through the conduit 27, heated to 270° C., at a flow rate of 32.3 parts by weight/hour (5.6 parts by weight/hour of chlorine, 1.1 parts by weight/hour of cyanogen chloride and 25.6 parts by weight/hour of cyanuric chloride) to the fractionation column 2 shown in FIG. 1.

In essence, the fractionation column has two main functions. In its rectifying section 4 it functions as a "gas washer," i.e. the refluxing phosphorous oxychloride washes the cyanuric chloride gradually out of the gaseous mixture. The function of the stripping section 3 is—apart from the progressive condensation of cyanuric chloride—the separation of the phosphorous oxychloride from the cyanuric chloride.

The inorganic solvent used in this process is unique in that its properties surprisingly meet a great number of indispensable and partly interrelated criteria. It is completely stable to attack from chlorine, cyanogen chloride, hydrogen chloride and cyanuric chloride, and is thermally stable at the maximum working temperatures (about 200° to 350° C.). It has no catalytic activity on any of the gaseous components and does not act as a catalyst poison, should any minor amount find its way back with the residual cyanogen chloride and chlorine gases into the catalytic trimerization unit of the overall cyanuric chloride process. It has an exceedingly good solubility for cyanuric chloride, 1 part by weight of phosphorous oxychloride dissolving e.g. 0.125 part by weight of cyanuric chloride at 20° C., 1.20 parts at 116° C. and 22.8 parts at 1,144° C., this makes possible the operation of a distillation column as described above without disturbance by solid cyanuric chloride separating out of the refluxing liquid. Furthermore it permits to operate the said fractionation column with relatively small quantities of phosphorous oxychloride.

The boiling point of phosphorous oxychloride of 105° C. lies between the boiling points of cyanuric chloride (195° C.) and cyanogen chloride (13° C.). This fact together with our finding that no azeotropes occur with any of the components of the system permits easy separation of this solvent from the said components. Finally, it is a cheap and easily available industrial chemical.

Depending on the further uses of cyanuric chloride, master batches of the liquid chemical can be prepared in any desired solvent.

The term "substantially pure cyanuric chloride" as used in this application means that the content of cyanuric chloride in the final product amounts to at least 99.5 percent calculated on the total weight of the product.

To illustrate the invention in detail by way of specific examples, reference is made hereinbelow to the attached drawings.

EXAMPLE 1

Liquid cyanuric chloride is recovered from a gaseous mixture containing the following components:

| | |
|---|---|
| cyanuric chloride | 79.3 weight % |
| cyanogen chloride | 3.4 weight % |
| chlorine | 17.3 weight % |

This gaseous mixture is manufactured in accordance with the process described in U.S. Pat. No. 3,312,697. It is fed at 220° C. at a rate of 32.3 parts by weight/hour into the fractionation column.

The cyanuric chloride vapor entering and being condensed in the fractionation column forms a pool of liquid cyanuric chloride in the evaporator, boiling at 198–200° C. From this pool, pure liquid cyanuric chloride of the described quality is withdrawn through the syphon at a rate of 25.6 parts by weight-hour. A part of the cyanuric chloride in this pool is vaporized and the vapors are fed back into the fractionation column at a temperature of 197°–199° C. to achieve optimum working conditions.

The temperature at the top of the rectifying section is held at 140°–145° C. This temperature is regulated by the heat input into the evaporator and the holdup of the column with respect to phosphorous oxychloride, which is about 8 parts by weight. This phosphorous oxychloride is vaporized by the rising hot gases and cyanuric chloride vapors at a rate of about 100 parts by weight/hour. Simultaneously the major part of the cyanuric chloride vapors is condensed and flowed back to the evaporator. Most of the vaporized phosphorous oxychloride and the remainder of the cyanuric chloride vapors leaving the top of the column is recondensed in an ordinary reflux condenser. The latter is operated with a cooling medium having a temperature of 15°–25° C., preferably 15°–18° C. At this temperature the amount of uncondensed phosphorous oxychloride is about 0.2 part by weight/hour. The composition of the residual gases withdrawn from the heat exchanger at the rate of 6.9 parts by weight/hour consists of 5.6 parts by weight/hour of chlorine (81.2 weight percent), 1.1 parts by weight/hour of cyanogen chloride (15.9 weight percent) and 0.2 part by weight/hour of phosphorous oxychloride (2.9 weight percent). The phosphorous oxychloride is then separated from the cyanogen chloride and chlorine in a small rectifying column and recycled to the fractionation column. Chlorine and cyanogen chloride are withdrawn from the small rectifying column.

The overall yield including the trimerization reaction is 96 percent of the cyanogen chloride entering the trimerization unit. This yield can be raised close to 100 percent by recycling the residual gases to the trimerization unit as described above.

The liquid cyanuric chloride obtained according to the present invention is practically pure, the only impurity being less than 0.005 percent by weight of phosphorous oxychloride.

EXAMPLE 2

Using the equipment and the working procedure as described in example 1 and according to the flowsheet FIG. 1, liquid cyanuric chloride is recovered from a gaseous mixture containing the following components:

| | |
|---|---|
| cyanuric chloride | 43.8 weight % |
| cyanogen chloride | 2.3 weight % |
| chlorine | 26.6 weight % |
| hydrogen chloride | 27.3 weight % |

This gaseous mixture is manufactured according to French Pat. No. 1,311,400. It is fed at a rate of 58.4 parts by weight/hour into the fractionation column. Part of the cyanuric chloride vapor entering the fractionation column is condensed by heat exchange with the liquid refluxing in the fractionation column and forms a pool of liquid cyanuric chloride in the evaporator, boiling at 198°–200° C. From this pool pure liquid cyanuric chloride of the same quality as described in example 1 (i.e. with less than 50 p.p.m. phosphorous oxychloride) is withdrawn through the syphon at a rate of 25.6 parts by weight/hour. Part of the cyanuric chloride in the liquid pool is vaporized and the vapors fed back to the fractionation column at a temperature of 197°–199° C. to achieve optimum working conditions as described in example 1.

We claim:

1. A process for continuous recovery of substantially pure liquid cyanuric chloride from a gaseous mixture containing the same, which comprises introducing said gaseous mixture into a fractionation column, cooling said mixture in said column to condense part of the cyanuric chloride to form liquid cyanuric chloride, contacting the gases remaining after the condensation with liquid phosphorous oxychloride to dissolve the remaining cyanuric chloride retained in the residual gases in the phosphorous oxychloride, fractionating the resulting solution of cyanuric chloride in phosphorous oxychloride to separate said remaining cyanuric chloride from said phosphorous oxychloride and continuously recovering the total cyanuric chloride in liquid form.

2. A process as described in claim 1, which comprises condensing part of the cyanuric chloride contained in the gaseous mixture at temperatures between 195°–200° C.

3. A process as described in claim 1, which comprises fractionating the solution of phosphorous oxychloride and cyanuric chloride at temperatures between 90°–198° C.

4. A process as described in claim 1, which comprises using an initial gaseous mixture and a mixture of the residual gases containing chlorine.

5. A process as described in claim 4, wherein the initial gaseous mixture has a cyanuric chloride content of from about 80–95 percent and a chlorine content of from about 5–20 percent and cyanogen chloride content of from less than 3 percent, all percentages being calculated on the total weight of the gaseous mixture.

6. A process as described in claim 1, wherein the initial gaseous mixture and the mixture of residual gases contain hydrogen chloride, chlorine and cyanogen chloride.

7. A process as described in claim 6, wherein the initial gaseous mixture has a cyanuric chloride content of from about 40–55 percent, a chlorine content of about 10–30 percent, a hydrogen chloride content of about 20–30 percent and a cyanogen chloride content of less than 2.5 percent, all percentages being calculated on the total weight of the gaseous mixture.

8. A process as described in claim 3, wherein the said solution is fractionated at a temperature ranging from about 140°–180° C.